Feb. 10, 1970      A. KUNEVICIUS      3,494,075

RESILIENT CAR DOOR EDGE PROTECTOR

Filed Aug. 22, 1968

INVENTOR.
ALEX KUNEVICIUS
BY Bosworth, Sessions,
Herrstrom + Cain

ATTORNEYS

United States Patent Office 3,494,075
Patented Feb. 10, 1970

3,494,075
RESILIENT CAR DOOR EDGE PROTECTOR

Alex Kunevicius, Independence, Ohio, assignor to Custom Trim Products, Inc., Cleveland, Ohio, a corporation of Ohio
Continuation-in-part of application Ser. No. 601,473, Dec. 13, 1966. This application Aug. 22, 1968, Ser. No. 754,706
Int. Cl. B60r *13/04, 13/02*
U.S. Cl. 49—462                                             9 Claims

ABSTRACT OF THE DISCLOSURE

A flexible and resilient door protector for encircling the edge of a door to protect the door and any surface against which the door may strike. The door protector has a frictional engagement with both sides of the door, includes a cushion for absorbing vibration and shock mounted on the protector adjacent the door and a pressure sensitive adhesive is disposed on the face of the cushion remote from the protector for securing the protector in position on the door and about the edge thereof.

CROSS REFERENCE TO RELATED APPLICATIONS

This application is a continuation-in-part of applicant's co-pending application Ser. No. 601,473 filed Dec. 13, 1966, now Patent Number 3,439,950, issued Apr. 22, 1969, which was, in turn, a continuation-in-part of application Ser. No. 477,273 filed Aug. 4, 1965, now abandoned.

BACKGROUND OF THE INVENTION

Field of the invention

This invention relates to door protectors and, more particularly, to door protectors for automobiles and other vehicles which encircle or envelop the edge of the door to protect the door and any object against which the door may strike when the same is opened.

Description of the prior art

The problem of damage to the surface and edge of the doors of automobiles and other vehicles, in parking lots and other locations, because of striking against another object when opened and to other surfaces because of being struck or damaged by the door of an adjacent vehicle when such adjacent vehicle door is opened is one of long standing for which an effective, efficient and practical solution has long been sought. Suggested solutions have, in some instances, taken the form of protective bumpers or moldings carried on the surface of the vehicle and presenting a resilient surface which other doors will strike first, if the other doors swing against the vehicle upon which the moldings or bumpers are mounted.

Moldings of this type embodying the disclosures and inventions of the patent applications of which this application is, directly and indirectly, a continuation-in-part have been successful, have gone a long way toward solving the problem and have been widely adopted and used for the aforesaid purpose—even finding favor as original equipment on some automobiles.

However, through the years a second form of protective device adapted to slip or be positioned over the edge of a door, both to fend off blows delivered by other doors and, more particularly, to protect the door edge from chipping or other damage should it strike an adjacent surface, as well as such an adjacent surface itself have been proposed. Such devices have not been widely adopted for permanent use, however, because their unattractive appearance detracted from the over-all appearance of the automobile or vehicle upon which they were mounted, because of their high cost when formed of chromed metal, because of the difficulty of securing the protector to the door permanently, without creating areas which were especially vulnerable to attack by rust and corrosion or because metal or other rigid protectors were not resilient and, while protecting the vehicle upon which they were mounted, not only did not protect but actually caused further damage to the surfaces, such as other automobiles, which they struck during operation (opening) of the door upon which they were mounted.

SUMMARY OF THE INVENTION

Therefore this invention comprises and has for its general object the provision of a new and improved door protector for automobile and other doors.

Further objects of this invention include the provision of a new and improved door protector for automobile and other doors, which is flexible and resilient; which adheres to the door and resists loosening and dislodgment even though the door be subject to shock and vibration; which protects not only the edge of the door upon which it is mounted but also any surface against which the door edge may strike; which encircles or envelops the edge of the door and is otherwise secured and adhered to the door on only one side thereof; which does not detract from the decorative appearance of the vehicle or door upon which it is mounted; which is, itself, pleasing and decorative in appearance; which is easily and economically manufactured, installed and used; which can be used on automobiles of different makes and doors having a wide range of different contours without modifications or special adaptation; and which may be mounted on the door without making or requiring portions which are more easily attacked by rust and corrosion.

A still further object of this invention is to provide a new and improved door protector for automobile and other doors which obtains one or more of the objects set forth above.

These and other objects and advantages of this invention will appear from the following description of a preferred form thereof, reference being had to the drawings.

DESCRIPTION OF THE PREFERRED EMBODIMENTS

Figure 1:
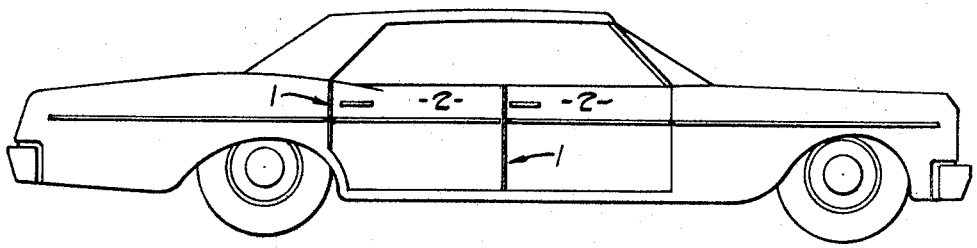
FIGURE 1 is a side view of an automobile with door protectors embodying this invention mounted thereon.

Door protectors embodying a preferred form of this invention are indicated generally at 1, FIGURE 1, together with the door 2 upon which they are mounted, respectively.

Figure 3:
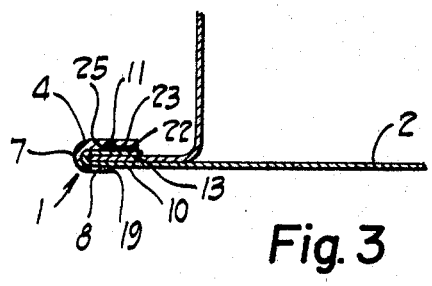
FIGURE 3 is a broken, horizontal sectional view, on an enlarged scale taken long the line 3—3 of FIGURE 1.

As noted above and shown in FIGURE 3, door protector 1, encircles or envelops the edge 4 of the door 2 to both protect the door edge and, in the preferred form of this invention, to protect any surface or object against which the door edge may swing or bump when the door is opened.

To this end, a door protector 1 embodying a preferred form of this invention comprises a generally J-shaped or bifurcated body member 5 having a base portion 7 adapted to rest against the edge 4 of the door, a first leg 8, extending substantially perpendicularly from base 7 along one side 10 of the door 2, and a second leg 11, extending substantially perpendicular to the base 7 and in spaced relation with and in the same general direction from the base as the leg 8 along the other side, 13, of the door. Base 7 of body 5 is of a width substantially equal to or slightly larger than the thickness of the door edge upon which the protector is to be mounted. Further, in order to improve the adhesion of the protector to the door, in general, to ensure a tight sealing contact between the protector and the door, particularly on the side which is normally the exposed or exterior side, and to prevent curling or lifting of the free edge of the protector with a resultant deleterious effect on the appearance of the protector and the door upon which it is mounted, the first leg 8 of protector 1 is preferably curved or rounded as at 15 so as to have a smooth flexible somewhat hingelike juncture 16 with base 7 (note the contrasting positions of leg 8 in the free, FIGURE 2, and in use positions, FIGURE 3) and to provide an end or tip 18 which tends to bite into and firmly engage and engage against the side 10 of the door when the protector is positioned on the door. Further, end or tip 18 is also rounded or beveled as at 19 to provide a pleasing appearance and juncture between the protector and the door, when the same is viewed in an installed and in use position.

Thus the legs 8 and 11 firmly and together engage around the edge 4 of the door 2 and base 7 is, preferably, seated firmly against the edge 4 so as to better reduce or resist any tendency of the protector to be tipped or rotated off the door edge due to lateral forces exerted on the base. Curve 15 is preferably of such magnitude that the end 18 of leg 8 is disposed nearer leg 11 than the center of base 7 when the protector is in an at rest condition and preferably has the center of its radius within the bounds or confines of the protector itself.

In order to more securely mount protector 1 on the door 2 and, in particular, to prevent dislodgment or partial dislodgment of the protector from the door due to vibration, shock or other similar cause and to prevent a simple tug or pull on the protector in a direction parallel to the door and away from the edge thereof from pulling the protector off of or partially off of the door, protector 1 also includes an adhesive, such as pressure sensitive adhesive 22, by which it is adhered to the door and a cushion layer 23 carried on the body member 5, leg 11, for example, between the body member and the adhesive 22. Cushion layer 23 is of material sufficiently thick of sufficient absorbent quality, polyurethane foam or similar material, preferably at least about $\frac{1}{32}''$ thick, to absorb vibrations and the like, to which the door is normally subjected, as during operation of the vehicle of which it is a part.

Further, in order to provide a sufficiently large contact area, on the one hand, and to improve the appearance of the protector and deleterious effect to the appearance of the door upon which the protector is mounted on the other hand, cushion layer 23 is preferably disposed on the second leg 11 (inner leg in use) so as to rest against the inner or normally unexposed side 13 of the door. Accordingly, leg 8 may be and preferably is shorter (of less width) than the leg 11, as shown, and thus more pleasing in appearance when installed and in use, since it is more inconspicuous, both in and of itself on a door and when two protectors are juxtaposed on adjacent doors (front and rear automobile doors, for example) as shown in FIGURE 1, and, while fully protecting the door edge, shows only a narrow band or strip.

In order to provide for a relatively tight slip fit between the door and protector, as described above, when protector 1 also, as preferred, includes a cushion layer 23, the outer, relative to base 7, extremity of leg 11 is preferably provided with a longitudinally extending seat 25 on the side thereof toward leg 8 and, therefore, the door upon which the protector is mounted. Seal 25 is of a depth slightly less than the thickness of the cushion layer 23 and of a width substantially equal to that of the cushion, thus providing means whereby the cushion is carried on the protector and the benefits thereof obtained in addition to and not in substitution of the functions and mode of operation of the protector as otherwise described above.

Figure 2:
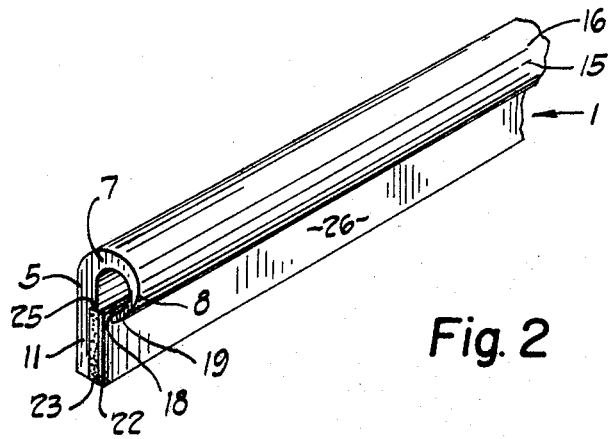
FIGURE 2 is a perspective view of a door protector embodying this invention.

Further, in order to protect the adhesive 22 during handling and shipping of the protector when, as preferred, the adhesive is pressure sensitive, protector 1 also includes a protective or backing strip 26, FIGURE 2, which is carried on the adhesive 22 and removed therefrom before the protector 1 is mounted on the door.

In order to provide the maximum protection both to the door edge 4 of the door upon which protector 1 is mounted and to any surface or object which the door edge might otherwise strike, body member 5 is preferably formed of a resilient and flexible material which absorbs shock upon impact and which bends and twists to permit mounting of the protector on a door edge of angular or sculptured contour, such as normally found on an automobile, without modification, cutting or mutilation of the protector. In addition, body member 5 must be weather resistant and retain its resiliency and flexibility over a wide range of weather and temperature conditions, without hardening, cracking or otherwise ceasing to function. Accordingly, body member 5 is preferably and conveniently extruded of vinyl chloride and, in a preferred form suitable for use on most makes of modern automobiles, has a leg 11 of about ½ inch width, a base of about $\frac{3}{16}$ inch width and a leg 8 of about ¼ inch width and a radius, in an at rest position, of about ¼ inch, albeit the portion of leg 8 adjacent the end 18 may be and preferably is somewhat tangential to the radius in order to better obtain the objects and advantages of this invention.

Protector 1 is of any desired length in use but preferably extends from about the level of the window, in an automobile door, downwardly to the bottom of the door. Also, if desired and if only certain of the objects and advantages of this invention are to be realized, body member 5 can be made of a rigid member when adherence of the protector to the door is secured by means of an adhesive disposed on cushion layer 23.

Modifications, changes and improvements to the forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

I claim:

1. A door protector for doors of motor vehicles, and the like, comprising a longitudinally extending flexible, resilient, bifurcated body member having a base portion, a first leg portion extending from said base portion and a second leg portion extending from said base portion in spaced relation with and in the same general direction as said first leg portion, said first leg portion being flexible about an axis parallel with its juncture with said base portion and being curved toward said second leg portion and having an end remote from said base portion disposed nearer said second leg portion than its juncture with said base portion, said second leg portion having a greater width, in a direction transverse of said base portion, than said first leg portion, pressure sensitive adhesive means on said second leg portion for adhering said door protector to a door, said pressure sensitive adhesive means being on said part of said second leg portion that extends beyond said first leg portion, and a protective backing strip covering said pressure sensitive adhesive means.

2. The door protector according to claim 1 with a cushion layer on said second leg portion intermediate said second leg portion and said pressure sensitive adhesive means.

3. The door protector according to claim 2 in which said second leg portion includes a recessed seat of a width at least as wide as said cushion layer and a depth no deeper than the thickness of said cushion layer and said cushion layer is in said seat.

4. The door protector according to claim 3 in which said cushion layer is at least about one thirty-second inch thick.

5. The door protector according to claim 4 in which said first leg portion has an edge remote from said base portion and is tapered toward and at least adjacent said edge on the side thereof remote from said second leg portion.

6. A door protector for automobile and other doors comprising a longitudinally extending bifurcated body member having a base portion, a first leg portion extending from said base portion, a second leg portion extending from said base portion in spaced relation with and in the same general direction as said first leg portion, a cushion layer on one said leg portion on the side thereof toward the other said leg portion, and adhesive means on the surface of said cushion layer remote from the one said leg portion.

7. The door protector according to claim 6 in which said adhesive means is a pressure sensitive adhesive, and a protective strip covering and detachably secured to said pressure sensitive adhesive.

8. In combination a motor vehicle door having an edge and adjacent inside and outside surfaces, and a door protector, said door protector comprising a longitudinally extending bifurcated body member having a base portion, a first leg portion extending from said base portion, a second leg portion extending from said base portion in spaced relation with and in the same general direction as said first leg portion, a cushion layer on said second leg portion on the side thereof toward the said first leg portion, and adhesive means on the surface of said cushion layer remote from the said second leg portion, said door protector being positioned over said edge of said door with said adhesive means adhered to said inside surface of said door and said cushion strip disposed between said adhesion with the inside of said door and said door protector and said first leg portion overlying said outside surface of said door.

9. The combination according to claim 8 in which said other leg portion has an edge remote from said base portion and said other leg portion is tapered toward and at least adjacent said edge on the side thereof remote from said one leg portion.

References Cited

UNITED STATES PATENTS

| | | | |
|---|---|---|---|
| 2,057,873 | 10/1936 | Atwood | 161—88 |
| 2,226,615 | 12/1940 | Killen | 49—462 |
| 3,173,826 | 3/1965 | Campbell et al. | 161—161 |

ARTHUR L. LA POINT, Primary Examiner

H. BELTRAN, Assistant Examiner

U.S. Cl. X.R.

16—86; 52—716; 161—88; 293—1; 293—62